US008472397B2

(12) United States Patent
Cai et al.

(10) Patent No.: US 8,472,397 B2
(45) Date of Patent: *Jun. 25, 2013

(54) UPLINK SCHEDULING AND RESOURCE ALLOCATION WITH FAST INDICATION

(75) Inventors: Zhijun Cai, Euless, TX (US); James Earl Womack, Bedford, TX (US); Takashi Suzuki, Ichikawa (JP)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/484,147

(22) Filed: May 30, 2012

(65) Prior Publication Data

US 2012/0236808 A1      Sep. 20, 2012

Related U.S. Application Data

(63) Continuation of application No. 13/244,733, filed on Sep. 26, 2011, now Pat. No. 8,213,930, which is a continuation of application No. 11/741,562, filed on Apr. 27, 2007, now Pat. No. 8,064,390.

(51) Int. Cl.
*H04W 4/00* (2009.01)
(52) U.S. Cl.
USPC ............ 370/329; 370/310; 370/326; 370/336
(58) Field of Classification Search
USPC ................. 370/328, 329, 310, 314, 318, 319, 370/320, 321, 324, 335, 336, 352; 455/450, 455/451, 452.1
See application file for complete search history.

(56) References Cited

U.S. PATENT DOCUMENTS

| 6,868,079 | B1 | 3/2005 | Hunt |
|---|---|---|---|
| 6,973,052 | B2 | 12/2005 | Wang et al. |
| 6,975,629 | B2 | 12/2005 | Welin |
| 7,027,400 | B2 | 4/2006 | O'Neill |
| 7,221,945 | B2 | 5/2007 | Milford et al. |
| 2003/0157887 | A1 | 8/2003 | Willenegger |
| 2004/0093174 | A1 | 5/2004 | Lander |

(Continued)

FOREIGN PATENT DOCUMENTS

| CA | 2344911 A1 | 12/2001 |
|---|---|---|
| EP | 0529269 | 3/1993 |

(Continued)

OTHER PUBLICATIONS

Office Action dated Sep. 28, 2012, in Japanese Application No. 2010-504401, and English translation (7 pages).

(Continued)

*Primary Examiner* — Jean Gelin
(74) *Attorney, Agent, or Firm* — Finnegan, Henderson, Farabow, Garrett & Dunner, LLP

(57) ABSTRACT

Systems and methods for signalling transitions between talk-spurt state and silence state for wireless terminals having semi-persistently allocated uplink resources are employed. A layer 1/2 indication of the state transitions may be transmitted using a resource that is specifically allocated for that purpose. Alternatively, ACK/NACK signalling may be employed. Layer 1 indications may be employed for both state transition types. Alternatively, in-band MAC layer signalling may be used to signal state transition from talk-spurt state to silence, or the network may deduce this state transition on its own. A different uplink wireless transition resource is allocated for the talk-spurt state vs. the silence state.

21 Claims, 6 Drawing Sheets

U.S. PATENT DOCUMENTS

| | | |
|---|---|---|
| 2004/0185918 A1 | 9/2004 | Fan et al. |
| 2004/0253996 A1 | 12/2004 | Chen |
| 2004/0264433 A1 | 12/2004 | Melpignano |
| 2005/0009578 A1 | 1/2005 | Liu |
| 2005/0047387 A1 | 3/2005 | Frederiksen et al. |
| 2005/0063330 A1 | 3/2005 | Lee et al. |
| 2005/0122960 A1 | 6/2005 | Khan |
| 2005/0128998 A1 | 6/2005 | Jelitto et al. |
| 2005/0201353 A1 | 9/2005 | Lee et al. |
| 2005/0254444 A1 | 11/2005 | Meier et al. |
| 2005/0254459 A1 | 11/2005 | Qian |
| 2005/0265301 A1 | 12/2005 | Heo et al. |
| 2005/0281222 A1 | 12/2005 | Ranta-Aho et al. |
| 2006/0019641 A1 | 1/2006 | Vayanos et al. |
| 2006/0252449 A1 | 11/2006 | Ramesh |
| 2007/0004374 A1 | 1/2007 | Kneckt |
| 2007/0060167 A1 | 3/2007 | Damnjanovic et al. |
| 2007/0061433 A1 | 3/2007 | Reynolds et al. |
| 2007/0081498 A1 | 4/2007 | Niwano |
| 2007/0082620 A1 | 4/2007 | Zhang et al. |
| 2007/0087724 A1 | 4/2007 | Jang et al. |
| 2007/0133458 A1 | 6/2007 | Chandra et al. |
| 2007/0153727 A1 | 7/2007 | McBeath et al. |
| 2007/0155388 A1 | 7/2007 | Petrovic et al. |
| 2007/0171861 A1* | 7/2007 | Akhtar ......................... 370/329 |
| 2007/0254598 A1 | 11/2007 | Bachl et al. |
| 2008/0027717 A1 | 1/2008 | Rajendran et al. |
| 2008/0064386 A1 | 3/2008 | Nibe |
| 2008/0090583 A1 | 4/2008 | Wang et al. |
| 2008/0101211 A1 | 5/2008 | Rao |
| 2008/0101286 A1 | 5/2008 | Wang et al. |
| 2008/0117891 A1 | 5/2008 | Damnjanovic et al. |
| 2008/0132230 A1 | 6/2008 | Marinier et al. |
| 2008/0225783 A1 | 9/2008 | Wang et al. |
| 2008/0293426 A1 | 11/2008 | Kim et al. |
| 2009/0016278 A1 | 1/2009 | Wakabayashi |
| 2009/0116434 A1 | 5/2009 | Lohr et al. |
| 2009/0196242 A1 | 8/2009 | Sambhwani et al. |
| 2009/0253435 A1 | 10/2009 | Olofsson et al. |
| 2009/0274107 A1 | 11/2009 | Park et al. |
| 2009/0316811 A1 | 12/2009 | Maeda et al. |
| 2010/0150087 A1 | 6/2010 | Miki et al. |
| 2010/0278143 A1 | 11/2010 | Chun et al. |

FOREIGN PATENT DOCUMENTS

| | | | |
|---|---|---|---|
| EP | 0924890 | A2 | 6/1999 |
| EP | 1 289 181 | A1 | 3/2003 |
| EP | 1450240 | A2 | 8/2004 |
| EP | 1492263 | A1 | 12/2004 |
| EP | 1755251 | A2 | 2/2007 |
| KR | 10-2001-0080057 | | 6/2003 |
| KR | 10-2004-0050422 | | 6/2004 |
| WO | 00/21236 | | 4/2000 |
| WO | 02/33875 | A1 | 4/2002 |
| WO | 03/096707 | A2 | 11/2003 |
| WO | 2004/004194 | | 1/2004 |
| WO | 2005/022772 | | 3/2005 |
| WO | 2006002379 | | 1/2006 |
| WO | 2006/046754 | | 5/2006 |
| WO | 2006103498 | | 5/2006 |
| WO | 2007/014021 | | 1/2007 |
| WO | 2007025138 | | 3/2007 |
| WO | 2007/073118 | A1 | 6/2007 |
| WO | 2007/089797 | A2 | 8/2007 |

OTHER PUBLICATIONS

Office Action dated Jul. 12, 2012, in Canadian Application No. 2,685,192 (3 pages).

Motorola, Inc. "Optimization of VoIP over HSDPA," (R2-061252) 3GPP TSG-RAN-WG2 Meeting #53, Shanghai, China, May 8-12, 2006.

Samsung "Concerns on Group Scheduling," (R2-071135) 3GPP TSG-RAN2 Meeting #57bis, St. Julians, Malta, Mar. 26-30, 2007.

Ericsson "Scheduling Optimizations—way forward," (R2-071292) 3GPP TSG-RAN WG2 Meeting #57bis, St. Julians, Malta, Mar. 26-30, 2007.

Nokia "Uplink Scheduling for VoIP," (R2-071460) 3GPP TSG-RAN WG2 Meeting #57bis, St. Julians, Malta, Mar. 26-30, 2007.

NTT DoCoMo, Inc. "Uplink resource allocation scheme," (R2-062164) 3GPP TSG RAN WG2 #54, Aug. 28-Sep. 1, 2006, Tallinn, Estonia.

Alcatel-Lucent "DL Control Signaling and Multiplexing for VoIP," (R1-071721) 3GPP TSG RAN WG1 Meeting #48bis, St. Julians, Malta, Mar. 26-30, 2007.

NTT DoCoMo, Inc. "Comparison of persistent resource allocation schemes in L TE uplink," (R2-060283) 3GPP TSG RAN WG2 #56, Jan. 15-19, 2007, Riga, Latvia.

Lucent Technologies "Uplink Scheduling Requests for Real Time Services," (R2-062227) 3GPP TSG-RAN2 #54, Aug. 28-Sep. 1, 2006, Tallinn, Estonia.

Samsung "VoIP support in L TE," (R1-070961) 3GPP TSG RAN WG1 Meeting #48, St. Louis, Missouri, USA, Feb. 12-16, 2007.

LG Electronics Inc. "Uplink scheduling for VoIP," (R2-063273) 3GPP TSG RAN WG2 #56, Nov. 6-10, 2006, Riga, Latvia.

3rd Generation Partnership Project; Technical Specification Group Radio Access Network; "Physical layer aspects for evolved Universal Terrestrial Radio Access (UTRA) (Release 7)," 3GPP TR 25.814 V7.1.0 (Sep. 2006).

Research in Motion Limited, "Semi-persistent Scheduling and DRX Control", 3GPP TSG-RAN-WG2 Meeting #59, Aug. 2007.

Shun-Ren Yang and Yi-Bing, Lin, "Modeling UMTS Discontinuous Reception Mechanism" IEEE Transactions on Wireless Communications, Jan. 2005, pp. 312-319, vol. 4., No. 1.

Ericsson, Semi Persistent Scheduling, TSG-RAN WG2 Meeting # 55, Oct. 2006.

Ericsson, "Performance Gains of the Semi-Autonomous DRX Scheme for LTE", 3GPP TSG-RAN WG2 Meeting #58-bis, Jun. 2007.

Nokia, Nokia Siemens Networks, "Further Considerations on DL Semi-Persistent Scheduling", 3 GPP TSGRANWG2 Meeting # 58, May 2007.

PCT Search Report dated Aug. 8, 2008 based on PCT/CA2008/000770.

PCT Search Report dated Aug. 1, 2008 based on PCT/CA2008/000771.

PCT Search Report dated Feb. 28, 2009 based on PCT/US2008/073593.

European Search Report dated Dec. 16, 2008 based on EP 08162639.

PCT Search Report dated Feb. 6, 2009 based on PCT/US2008/073585.

European Search Report dated Dec. 16, 2008 based on EP 08162615.

PCT Search Report dated Dec. 26, 2008 based on PCT/US2008/073580.

European Search Report dated Nov. 25, 2008 based on EP 08162638.

Jiang, Dajie et al.; Principle and Performance of Semi-Persistent Scheduling for VoIP in LTE System; International Conference on Wireless Communications, Networking and Mobile Computing, 2007 (WiCom 2007),Sep. 21-25, 2007 (Sep. 21, 2007), pp. 2861-2864.

Fukui, N.; Study of Channel Quality Feedback in UMTS HSDPA; Personal, Indoor and Mobile Radio Communications, 2003. PIMRC 2003; 14th IEEE Proceedings on, vol. 1, pp. 336-340, Sep. 7-10, 2003 (Sep. 10, 2003).

Dottling et al.; Efficient Channel Quality Feedback Schemes for Adaptive Modulation and Coding of Packet Data,; Vehicular Technology Conference, 2004. VTC2004-Fall. 2004 IEEE 60th, vol. 2, pp. 1243-1247,Sep. 26-29, 2004 (Sep. 29, 2004).

Jeon et al.; Channel Adaptive CQI Reporting Schemes for UMTS High-Speed Downlink Packet Access; Vehicular Technology Conference, 2006. VTC2006-Fall. 2006 IEEE 64th, p. 1-5,Sep. 25-28, 2006 (Sep. 28, 2006).

European Search Report dated Sep. 12, 2007 based on EP 07 10 7587.

European Search Report dated Dec. 20, 2007 based on EP 07 10 8885.

PCT Search Report dated Apr. 17, 2008 based on PCT/CA2007/002368.

PCT Search Report dated Apr. 17, 2008 based on PCT/CA2007/000003.
PCT Search Report dated Mar. 13, 2008 based on PCT/CA2007/002311.
PCT Search Report dated May 21, 2008 based on PCT/CA2007/002299.
PCT Search Report dated Apr. 24, 2008 based on PCT/CA2008/000001.
3rd Generation Partnership Project; Technical Specification Group GSM/EDGE Radio Access Network; Mobile radio interface layer 3 specification; Radio Resource Control (RRC) protocol (Release 6) 3GPP TS 44.018 v6.21.0 (Mar. 2007) (367 pages).
European Search Report dated Dec. 2, 2011, based on EP11167683.9 (11 pages).
Korean Office Action for Korean Application No. 10-2009-7024602, dated Dec. 14, 2011, with English translation (8 pages).
Motorola: "E-Utra Uplink L1/L2 Control Channel Mapping", R1-063075; 3GPP TSG RAN1 #47, Riga, Estonia; Nov. 6-10, 2006, (7 pages).
Office Action for U.S. Appl. No. 11/741,562 dated Jan. 19, 2011 (7 pages).
Office Action for U.S. Appl. No. 11/741,562 dated Jun. 17, 2010 (14 pages).
Office Action for U.S. Appl. No. 13/244,733 dated Dec. 14, 2011 (8 pages).
Office Action for U.S. Appl. No. 11/741,562 dated Oct. 30, 2009 (31 pages).
Office Action, dated Feb. 14, 2012, in corresponding European Application No. 07 108 885.0-2412 (5 pages).
Office Action, dated Dec. 21, 2011, in corresponding Japanese Application No. 2010-504401, with English translation (5 pages).

* cited by examiner

UPLINK SCHEDULING AND RESOURCE ALLOCATION WITH FAST INDICATION

This is a continuation of application Ser. No. 13/244,733, filed Sep. 26, 2011, which is incorporated herein by reference, which is a continuation of patented application Ser. No. 11/741,562, filed Apr. 27, 2007, issued as U.S. Pat. No. 8,064,390, which is incorporated herein by reference.

FIELD OF THE APPLICATION

The application relates to systems and methods for scheduling and resource allocation.

BACKGROUND

Semi-persistent scheduling has been considered for Voice over IP in the 3GPP Long Term Evolution. With semi-persistent scheduling, after an initial resource assignment, the same resource is used on an ongoing basis for a given wireless terminal. Between periods of active speech, so-called talk-spurt states, there is a silent period. A concern that has been expressed is how to efficiently handle the silent period between speech talk-spurts while using semi-persistent scheduling. In persistent scheduling, a resource is pre-allocated for a wireless terminal. During a silent period, if no indication that the resource will not be used by the wireless terminal is signalled, the resource will not be available to be reallocated for use by another wireless terminal, since the assumption must be made that the resource is needed. For very simple persistent scheduling without any enhancements, this means that considerable uplink capacity is lost.

For semi-persistent scheduling, in order to free up the resource during periods of silence state, the resource needs to be re-configured between periods of activity (talk-spurt state periods) and periods of silence state (silence state period) and vice versa. During the silent period, Silence Descriptor (SID) frames may be transmitted, for example to satisfy application layer constraints.

State transition includes the following two cases: transition from talk-spurt state to silence state and the transition from silence state to talk-spurt state. Note that the state transitions are aperiodic in the time domain. In one simple way to implement these transitions, whenever a silence state period is detected by the wireless terminal, the wireless terminal sends resource-release signalling to the network to free the pre-allocated resource through the random access channel (RACH) and whenever a talk-spurt is coming, the user will send an explicit request through the existing RACH resource request mechanism for the re-establishment of the semi-persistent resource for transmission of the talk-spurt state. Further, for the SID transmission during silence state, an explicit request is used to ask for the resource, again through the existing RACH resource request mechanism.

BRIEF DESCRIPTION OF THE DRAWINGS

Embodiments will now be described with reference to the attached drawings in which.

DETAILED DESCRIPTION

Figure 1:
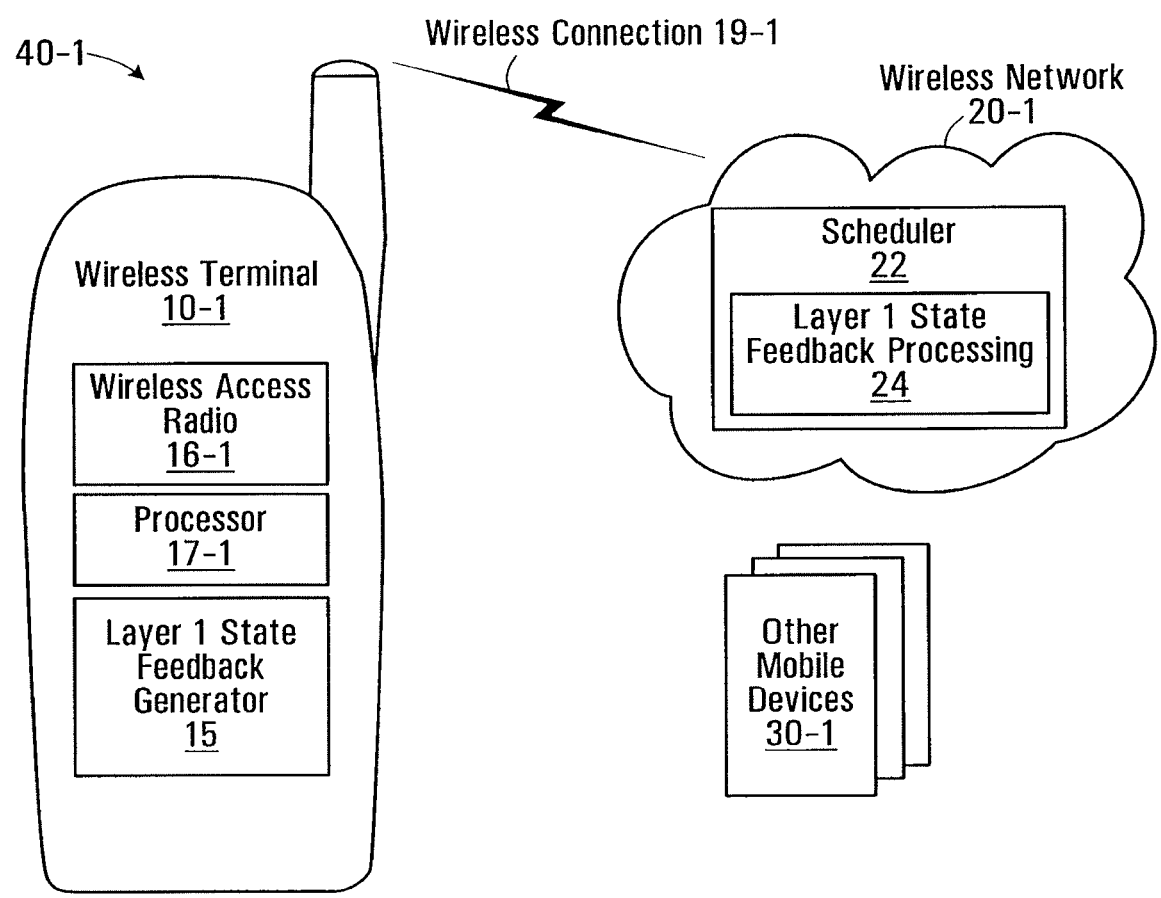
FIG. 1 is a schematic diagram of a network that implements layer 1 state feedback signalling.

A broad aspect provides a method comprising: receiving transmissions from a wireless terminal on a first uplink wireless transmission resource that is semi-persistently allocated to a wireless terminal such that the first uplink wireless transmission resource is allocated to the wireless terminal for periods that the wireless terminal is in an active state; determining when the wireless terminal has transitioned from the active state to an inactive state; determining when the wireless terminal has transitioned from inactive state to active state by receiving a layer 1 indication from the wireless terminal; while the wireless terminal is in the inactive state, making the first uplink wireless transmission resource available for re-allocation for other purposes.

Another broad aspect provides a method comprising: a wireless terminal, while in an active state, transmitting uplink communications using a first wireless transmission resource that is semi-persistently allocated to the wireless terminal in the sense that the first wireless transmission resource is allocated to the wireless terminal while in the active state; after completing a transmission while in the active state, the wireless terminal transitioning from the active state to an inactive state; in order to start transmitting in the active while in the inactive state, the wireless terminal transitioning from the inactive state to the active state and transmitting a layer 1 indication to indicate the transition from the inactive state to the active state.

Another broad aspect provides an apparatus comprising: an access network element that receives transmissions from a wireless terminal on a first uplink wireless transmission resource that is semi-persistently allocated to a wireless terminal such that the first uplink wireless transmission resource is allocated to the wireless terminal for periods that the wireless terminal is in an active state, and that also receives a layer 1 indication from the wireless terminal that indicate when the wireless terminal has transitioned from the active state to an inactive state; a scheduler with layer 1 state feedback processing function that determines when the wireless terminal has transitioned from the active state to an inactive state, determine when the wireless terminal has transitioned from inactive state to active state by processing the layer 1 indications received from the wireless terminal that indicate when the wireless terminal has transitioned from the active state to an inactive state, and while the wireless terminal is in the inactive state, make the first uplink wireless transmission resource available for re-allocation for other purposes.

Another broad aspect provides a wireless terminal comprising: a wireless access radio that, while in an active state, transmits uplink communications using a first wireless transmission resource that is semi-persistently allocated to the wireless terminal in the sense that the first wireless transmission resource is allocated to the wireless terminal while in the active state, and after completing a transmission while in the active state the wireless terminal transitioning from the active state to an inactive state; a layer 1 state feedback generator that, in order to start transmitting in the active while in the inactive state, generates a layer 1 indication to indicate the transition from the inactive state to the active state for transmission by the wireless access radio.

Another broad aspect provides a method comprising: receiving transmissions from a wireless terminal on a first uplink wireless transmission resource that is semi-persistently allocated to a wireless terminal such that the first uplink wireless transmission resource is allocated to the wireless terminal for periods that the wireless terminal is in an active state; determining when the wireless terminal has transitioned from the inactive state to an active state; determining when the wireless terminal has transitioned from active state to inactive state by receiving a state transition indication from the wireless terminal; while the wireless terminal is in the inactive state, making the first uplink wireless transmission resource available for re-allocation for other purposes.

In some embodiments, receiving a state transition indication from the wireless terminal comprises one of:
  receiving a layer 1 state transition indication;
  receiving a MAC layer state transition indication;
  receiving an application layer state transition indication.

Another broad aspect provides a method comprising a wireless terminal, while in an active state, transmitting uplink communications using a first wireless transmission resource that is semi-persistently allocated to the wireless terminal in the sense that the first wireless transmission resource is allocated to the wireless terminal while in the active state; after completing a transmission while in the active state, the wireless terminal transitioning from the active state to an inactive state and transmitting a state transition indication to indicate the transition from the inactive state to the active state; in order to start transmitting in the active while in the inactive state, the wireless terminal transitioning from the inactive state to the active state.

In some embodiments, transmitting the state transition indication comprises one of:
  transmitting a layer 1 state transition indication;
  transmitting a MAC layer state transition indication;
  transmitting an application layer state transition indication.

In the Background section, reference is made to a RACH based mechanism for signalling state transitions between talk-burst and silence state. Since voice state transitions may be frequent for a user, and considering the number of VoIP users that might be supported is very large, the incurred overhead with this approach could be very large. Furthermore, since RACH employs a contention based access mechanism, a heavy RACH load may result in an access delay that is long when a talk-spurt state is coming, particularly considering frequent transitions and a large number of VoIP users. This could have a negative effect on the voice quality.

Referring now to FIG. 1, shown is a block diagram of an example communication system 40-1 that employs layer 1 fast state feedback for resource scheduling and allocation purposes. The communication system 40-1 has a wireless network 20-1, a wireless terminal 10-1 (also referred to as a UE (user element)), and other wireless terminals 30-1; the communication system 40-1 may have other components, but they are not shown for sake of simplicity. For example, the wireless terminal and the network will each have transmitters and receivers, having one or more antennas each. The wireless terminal 10-1 has a wireless access radio 16-1, a processor 17-1, and a layer 1 state feedback generator 15. The wireless terminal 10-1 may have other components, but they are not shown for sake of simplicity. The other wireless terminals 30-1 may each have components similar to those of the wireless terminal 10-1. Alternatively, some or all of the other wireless terminals 30-1 may have different components than those of the wireless terminal 10-1. The wireless network 20-1 has a scheduler 22 that includes a layer 1 state feedback processing function 24.

In operation, the wireless terminal 10-1 communicates with the wireless network 20-1 using its wireless access radio 16-1. The wireless communication is over a wireless connection 19-1 between the wireless terminal 10-1 and the wireless network 20-1. The other wireless terminals 30-1 may similarly communicate with the wireless network 20-1 over respective wireless connections (not shown). The communication with the wireless network 20-1 might for example be telephony, or other forms of communication such as email. The layer 1 state feedback generator 15 generates layer 1 feedback that signals to the network when the wireless terminal is transitioning from silence state to talk-spurt state. While in a talk-spurt state, the wireless terminal transmits using a first semi-persistent allocation. In some embodiments, the wireless terminal 10-1 also generates signalling that indicates when there is a transition from talk-spurt state to silence state. This may be performed using the layer 1 state feedback generator 15, but other mechanisms are also contemplated, for example MAC layer signalling is employed in some embodiments. Furthermore, in some embodiments, the network autonomously detects this transition without any signalling from the wireless terminal 10-1. In some embodiments, a layer 1 resource is specifically allocated for the purpose of state transition signalling.

In the wireless network 20-1, the scheduler 22 is responsible for scheduling and allocating uplink wireless transmission resources. It does this by allocating a resource that is to be used by the wireless terminal while it is in a talk-spurt state. The layer 1 state feedback processing function 24 processes the layer 1 feedback received from the wireless terminal to determine when there is a transition from silence state to talk-spurt state. The scheduler 22 also determines when the wireless terminal is in silence state. It can do this as a function of layer 1 feedback, MAC-layer in band indications, or it can determine this autonomously. For periods that the scheduler 22 concludes that the wireless terminal is in the silence state, the resource that was allocated to the wireless station is available for other uses. For example, it might be used to allocate to the same or different wireless stations for signalling or data communications. However, as soon as the scheduler 22 concludes that the wireless terminal has transitioned back to the talk-spurt state, the resource is again allocated to the wireless terminal. The resource is persistently allocated in the sense that it is the same resource that is allocated; particulars of the resource are not required except at the start.

In the illustrated example, the layer 1 state feedback generator 15 is implemented as software and is executed on the processor 17-1. However, more generally, the layer 1 state feedback generator 15 may be implemented as software, hardware, firmware, or any appropriate combination thereof. Similarly, the scheduler 22 may be implemented as software, hardware, firmware, or any appropriate combination thereof.

Figure 2:
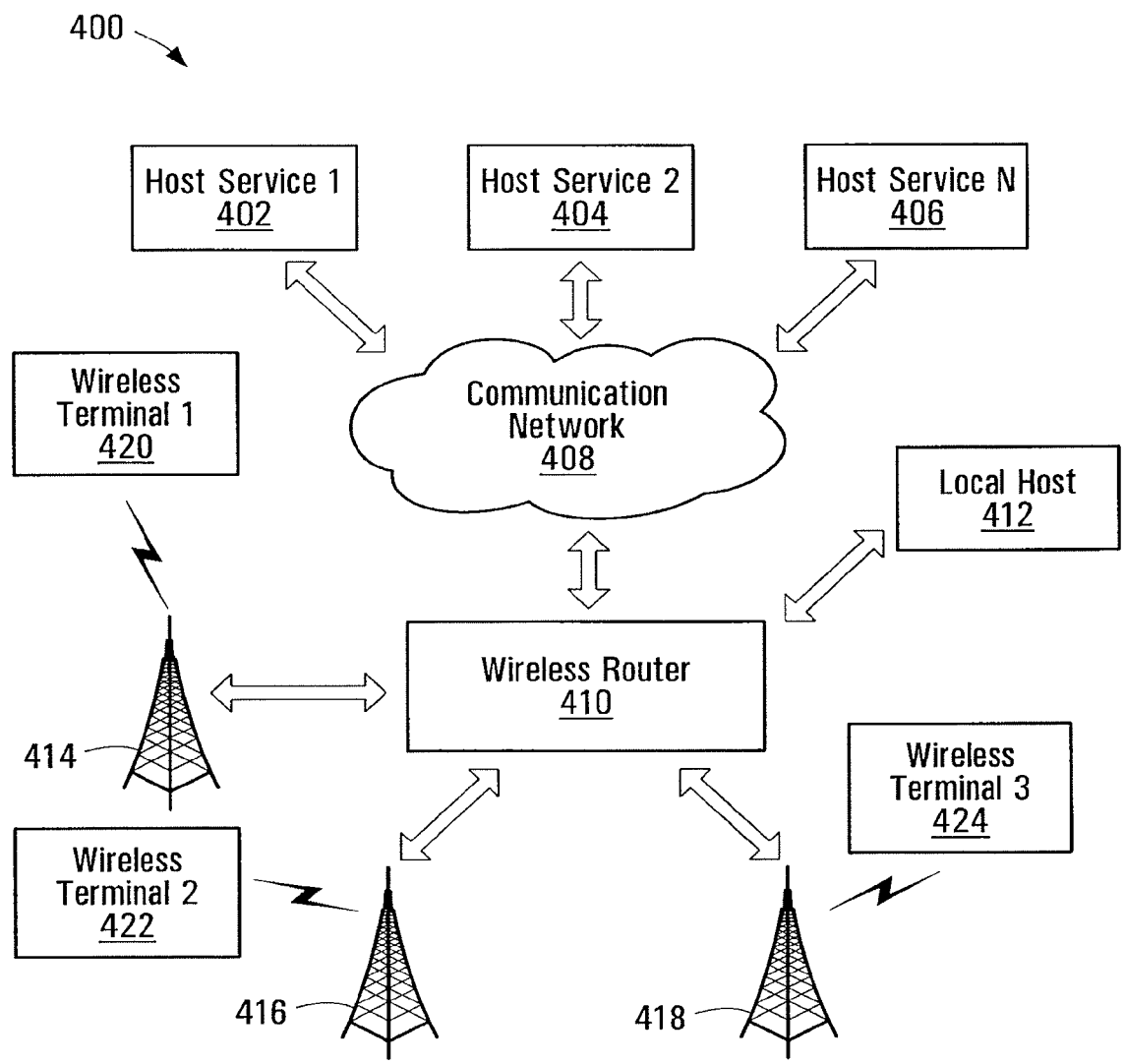
FIG. 2 is another schematic diagram of a network that implements layer 1 state feedback signalling.

FIG. 2 is an exemplary environment in which a wireless communication system 400 in accordance with some embodiments may be practiced. Communications between illustrated network elements can be implemented using the above-summarized layer 1 state feedback mechanisms. The exemplary wireless communication system 400 includes a plurality of host services (three shown, 402, 404, and 406), each of which may have a plurality of services such as, but not limited to, e-mail, calendar, Internet web browser, and other applications, available to their subscribers. In this particular example, the host services 402, 404, and 406 are typically configured as servers, each containing at least one processor, a storage means and each using a network interface over which communications with a communication network 408 such as the Internet can be effectuated. The host services 402, 404 and 406 send and receive messages over communications network 408 to and from wireless router system 410 allowing communication between the host services 402, 404, and 406 and the wireless router system 410.

The wireless router system 410 is connected to a plurality of wireless networks (three shown, 414, 416, and 418), each of which may support a plurality of wireless terminals (one in each wireless network is shown, 420, 422, and 424). The wireless networks 414, 416, and 418 may be a cellular telephone network, such as a global system for mobile communication (GSM) network, or a code division multiple access (CDMA) network, a two-way paging network, a short range wireless network such as Bluetooth™, an IEEE 802.11 compliant network, and others alike. The wireless terminals 420, 422, and 424 are devices compatible with the corresponding wireless network.

Wireless terminals 420, 422 and 424 are two-way communication devices with advanced data communication capabilities having the capability to communicate with other wireless terminals or computer systems, such as host services 402, 404, 406, through a network of transceiver stations, including wireless router 410 and communication network 408. The mobile communication devices 420, 422 and 424 may also have the capability to allow voice communication. Depending on the functionality provided, it may be referred to as a data messaging device, a two-way pager, a cellular telephone with data messaging capabilities, a wireless Internet appliance, or a data communication device (with or without telephony capabilities). The preceding list is not meant to be exhaustive; the embodiments described herein can be practiced with any type of wireless terminal, whether listed above or not. In the example shown in FIG. 1, wireless terminals 420, 422 and 424 each contain a processor, a radio, an information storage means and at least one software module adapted to perform tasks. In some embodiments, wireless terminals 420, 422 and 424 are capable of sending and receiving messages using the radio. Also in some embodiments, the at least one software module includes an event generator module, adapted to generate events, and a communications module, adapted to send and receive messages using the wireless terminal's radio.

Wireless terminals are generally capable of communicating over multiple communication channels. For example, short message service (SMS) messages arrive over the voice communication channel, whereas email messages arrive over a data communication channel. As explained above, the wireless terminal 420 includes modules, software for example, which are adapted to perform various tasks when executed in wireless terminal 420's processor. In one embodiment, the wireless terminal 420 contains both a communication module and an event generator module. The communication module is adapted to execute in wireless terminal 420's processor and in cooperation with the wireless terminal 420's radio is capable of sending and receiving messages. The event generator module is also adapted to execute in wireless terminal 420's processor and is capable of generating events in one of two ways: user generated events and device generated events. User generated events include such things as the user of wireless terminal 420 opening a messaging application resident in wireless terminal 420, such as an email application, the user of wireless terminal 420 rolling a wheel input device, such as a thumbwheel, the user of wireless terminal 420 pressing a key on wireless terminal 420's keyboard, the user of wireless terminal 420 logging in to wireless terminal 420 or the user of wireless terminal 420 electing to maintain an active session by responding to a prompt from wireless terminal 420. Device generated events include such things as the expiry of a timer, wireless terminal 420 generating a ping message to keep a session alive with the network or wireless terminal 420 commencing a data session, such as a PDP context, with a network.

One of the primary purposes of host services 402, 404 and 406 is to process information received from other sources, such as mail servers (not shown) and wireless terminals 420, 422, 424, and send the information on to the appropriate recipient, typically a different host service 402, 404, 406, mail server or wireless terminal 420, 422 or 424. Host services 402, 404 and 406 are configured to send and receive email messages and as such typically communicate with a mail server. Mail servers could include for example a Microsoft® Exchange® server, a Lotus® Domino® server, a Novell® GroupWise® server, an IMAP Server, a POP Server or a webmail server or any other mail server as would be understood by those in the art. The host services 402, 404 and 406 also contain a software module, which executes in their processor to achieve the desired sending and receiving of messages as well as the appropriate processing of information. In some embodiments the software module of each host service 402, 404, 406 is a messaging module, the messaging module is adapted to receive messages from at least one external mail server, send messages to wireless terminals 420, 422, 424, receive messages from the same wireless terminals and send messages to the at least one external mail server(s). The at least one external mail server(s) could also be at least one mobile data server(s) for example. The wireless router system 410 may also be directly connected to a host service, such as a local service 412, without the communication network 408. In another embodiment, it is possible for host services 402, 404 and 406 to communicate directly with wireless terminals 420, 422 and 424. In this embodiment, host services 402, 404 and 406 must be capable of addressing communications to wireless terminals 420, 422 and 424 without the aid of the wireless router system 410.

In the environment described in FIG. 2, messaging occurs between wireless terminals 420, 422 and 424 and host services 402, 404 and 406. It is possible for wireless terminals 420, 422 and 424 to send messages to and receive messages from host services 402, 404 and 406. As an example, when a message is received by any one of host services 402, 404, 406, the intended recipient, wireless terminals 420, 422 and 424 is informed by the host service 402, 404 and 406 that a message has arrived which needs to be retrieved by way of an enable message. Host service 402, 404 and 406 may send a plurality of enable messages to wireless terminal 420, 422 and 424 or host service 402, 404 and 406 may choose to send one enable message until wireless terminal 420, 422 and 424 fetches the pending message(s). A fetch command is issued by the wireless terminal 420, 422 and 424 upon the generation of an event by an event generator after an enable message has been received and is sent to host service 402, 404 and 406. The generated event and the enable message are independent and neither one influences the occurrence or likelihood of the other. When host service 402, 404 and 406 receives a fetch command, host services 402, 404 and 406 will send the pending message or messages to wireless terminals 420, 422 and 424 which issued the fetch command. Both the enable messages and the fetch message may or may not contain message identifiers. A message identifier uniquely identifies a message for wireless terminals 420, 422 and 424 and allows wireless terminals 420, 422 and 424 to retrieve specific messages. The host service 402, 404, 406 may send all pending messages should multiple messages be pending for the wireless terminals 420, 422 and 424 which issued the fetch command.

Figure 3:
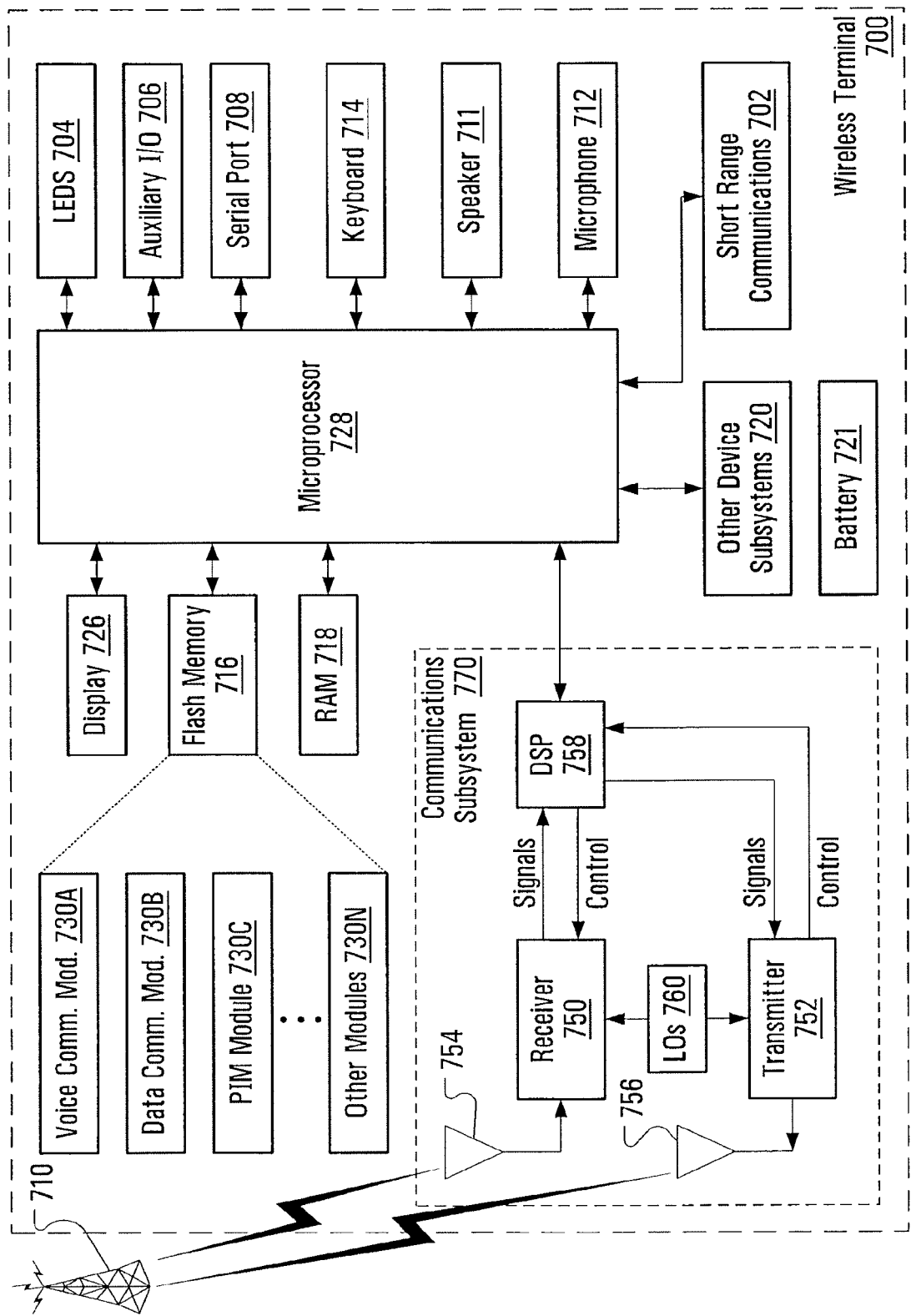
FIG. 3 is a detailed block diagram of a wireless terminal that implements layer 1 state feedback signalling.

Referring now to FIG. 3, shown is a block diagram of a mobile communication device 700 that may implement wireless terminal related methods described herein. It is to be understood that the wireless terminal 700 is shown with very specific details for example purposes only.

A processing device (a microprocessor 728) is shown schematically as coupled between a keyboard 714 and a display 726. The microprocessor 728 controls operation of the display 726, as well as overall operation of the wireless terminal 700, in response to actuation of keys on the keyboard 714 by a user.

The wireless terminal 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the wireless terminal 700 are shown schematically. These include: a communications subsystem 770; a short-range communications subsystem 702; the keyboard 714 and the display 726, along with other input/output devices including a set of LEDS 704, a set of auxiliary I/O devices 706, a serial port 708, a speaker 711 and a microphone 712; as well as memory devices including a flash memory 716 and a Random Access Memory (RAM) 718; and various other device subsystems 720. The wireless terminal 700 may have a battery 721 to power the active elements of the wireless terminal 700. The wireless terminal 700 is in some embodiments a two-way radio frequency (RF) communication device having voice and data communication capabilities. In addition, the wireless terminal 700 in some embodiments has the capability to communicate with other computer systems via the Internet.

Operating system software executed by the microprocessor 728 is in some embodiments stored in a persistent store, such as the flash memory 716, but may be stored in other types of memory devices, such as a read only memory (ROM) or similar storage element. In addition, system software, specific device applications, or parts thereof, may be temporarily loaded into a volatile store, such as the RAM 718. Communication signals received by the wireless terminal 700 may also be stored to the RAM 718.

The microprocessor 728, in addition to its operating system functions, enables execution of software applications on the wireless terminal 700. A predetermined set of software applications that control basic device operations, such as a voice communications module 730A and a data communications module 730B, may be installed on the wireless terminal 700 during manufacture. In addition, a personal information manager (PIM) application module 730C may also be installed on the wireless terminal 700 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless network 710 with the device user's corresponding data items stored or associated with a host computer system. As well, additional software modules, illustrated as other software module 730N, may be installed during manufacture.

Communication functions, including data and voice communications, are performed through the communication subsystem 770, and possibly through the short-range communications subsystem 702. The communication subsystem 770 includes a receiver 750, a transmitter 752 and one or more antennas, illustrated as a receive antenna 754 and a transmit antenna 756. In addition, the communication subsystem 770 also includes a processing module, such as a digital signal processor (DSP) 758, and local oscillators (LOs) 760. The specific design and implementation of the communication subsystem 770 is dependent upon the communication network in which the wireless terminal 700 is intended to operate. For example, the communication subsystem 770 of the wireless terminal 700 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, OFDM (orthogonal frequency division multiplexing), Personal Communications Service (PCS), Global System for Mobile Communications (GSM), etc. Other types of data and voice networks, both separate and integrated, may also be utilized with the wireless terminal 700.

Network access may vary depending upon the type of communication system. For example, in the Mobitex™ and DataTAC™ networks, wireless terminals are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless terminal 700 may send and receive communication signals over the communication network 710. Signals received from the communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the network 710 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750 and the transmitter 752. For example, gains applied to communication signals in the receiver 750 and the transmitter 752 may be adaptively controlled through automatic gain control algorithms implemented in the DSP 758.

In a data communication mode, a received signal, such as a text message or web page download, is processed by the communication subsystem 770 and is input to the microprocessor 728. The received signal is then further processed by the microprocessor 728 for an output to the display 726, or alternatively to some other auxiliary I/O devices 706. A device user may also compose data items, such as e-mail messages, using the keyboard 714 and/or some other auxiliary I/O device 706, such as a touchpad, a rocker switch, a thumb-wheel, or some other type of input device. The composed data items may then be transmitted over the communication network 710 via the communication subsystem 770.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the wireless terminal 700. In addition, the display 726 may also be utilized in voice communication mode, for example, to display the identity of a calling party, the duration of a voice call, or other voice call related information.

The short-range communications subsystem 702 enables communication between the wireless terminal 700 and other proximate systems or devices, which need not necessarily be similar devices. For example, the short-range communications subsystem may include an infrared device and associated circuits and components, or a Bluetooth™ communication module to provide for communication with similarly-enabled systems and devices.

In FIG. 2, the wireless terminal and the base stations can cooperate to implement one or more the methods described herein. More generally, the network side may be implemented by one or more network components that may include base stations, base station controllers, wireless routers, or mobile switching centres to name a few examples. The implementation particulars will depend on a given network configuration. In FIG. 3, microprocessor 728, RAM 718, communication sub-system 770, display 726, flash memory 716, voice module and data module can cooperate to implement one or more of the methods described herein. More generally, the implementation particulars will depend on a given wireless terminal configuration.

While the embodiments described are particularly applicable to real-time low rate packet transmissions, such as VoIP, it is to be understood they can be applied to other packet transmissions that may not necessarily be real-time or low rate, although the efficiencies realized with real-time low-rate applications may not necessarily be realized.

For VoIP implementations described herein, the two states of a wireless terminal are talk-spurt state and silence state. More generally, in some embodiments layer 1 signalling is employed to signal the transition between two states referred to as active and inactive. These states can be defined on an implementation specific basis; for example, in some embodiments a wireless terminal will stay in the active state notwithstanding short periods during which the wireless terminal has nothing to send. For VoIP implementations the active state corresponds to the talk-spurt state, and the inactive state corresponds to the silence state.

While the embodiments described herein are in the context of uplink transmission from a wireless terminal to a base station, more generally, some embodiments may be applied for the transmission from a transmitter to a receiver. The transmitter and receiver may be the base station and wireless terminal respectively in the event the embodiments are to be applied to downlink transmission, or they may be the wireless terminal and the base station respectively in the event the embodiments are to be applied to uplink transmission.

According to an embodiment of the application, a fast layer 1 talk-spurt state feedback channel is provided and used to signal transitions from silence state to talk-spurt state. In some embodiments such a channel is also used to signal transitions from silence state to talk-spurt state.

Figure 4:
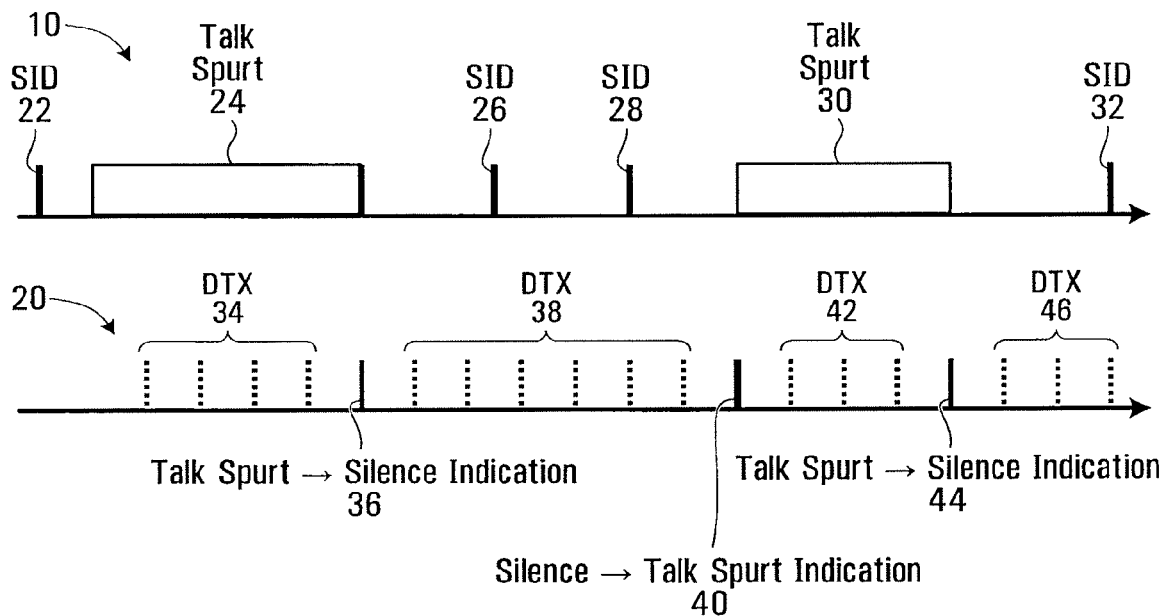
FIG. 4 is a signalling diagram showing VoIP transmissions from a wireless terminal to a base station, and showing layer 1 signalling to indicate state transitions.

A first example of the operation of the user of layer 1 indications to signal state transition will be described with reference to FIG. 4. In FIG. 4, generally indicated at 10 is a sequence of transmissions from a wireless terminal to a base station. Time is running from left to right in this Figure and the other figures described below. The figure represents a random sample of what might be transmitted as part of a VoIP session, but other session types are also contemplated. What is shown in the Figure is assumed to be part of a larger session that may include transmissions that precede and/or follow the specific transmissions shown. The transmissions include a SID frame 22, talk-spurt state 24, SID frames 26,28, talk-spurt state 30 and SID frame 32. During talk bursts 24,30, the wireless terminal is in the talk-spurt state, and between the talk bursts, the mobile terminal is in the silence state. A talk-spurt state may contain one or more transmit frames that are either contiguous or close enough together to warrant staying in the talk-spurt state. Generally indicated at 20 is an example of fast layer 1 signalling that is used to report the status of the voice activity on the wireless terminal side to the network. In some embodiments, the uplink transmission resource for this fast indication is pre-allocated for the wireless terminal. Other examples are described below. In the illustrated example, one information bit is used to indicate the two different state transitions. In the particular example illustrated, "1" means a state transition from talk-spurt state to silence state, and "0" means a state transition from the silence state to talk-spurt state. Thus, the layer 1 signalling 20 includes signalling 36 to indicate the transition from talk-spurt state to silence state, this following talk-spurt state 24. A next transition is signalled at 40 to signal a transition back to the talk-spurt state at the beginning of talk-spurt state 30. Another transition is signalled at 44 to indicate another transition from talk-spurt state to silence state. As discussed above, in some embodiments, there is a resource that is pre-allocated for this signalling. For this example, when there is nothing to signal, namely for periods between transition signallings, nothing is transmitted as indicated by periods of DTX (discontinuous transmission) 34,38,42,46.

While the wireless terminal is in the talk-spurt state, it transmits using a first pre-allocated resource. This resource is semi-persistently allocated in the sense that the same resource is used each time the wireless terminal is in the talk-spurt state; this means that there is no signalling necessary to indicate a new resource allocation to the wireless terminal except at the beginning when the resource is initially allocated. This might be done, for example, at the beginning of a call. For VoIP transmissions, in the talk-spurt state period, a resource is allocated for the user on the uplink that is sufficient to deliver voice packets.

While the wireless terminal is in the silence state, the wireless terminal transmits SID frames using a second pre-allocated resource. This second resource is also semi-persistently allocated in the sense that the same resource is used each time the wireless terminal is in the silence state; this means that there is no signalling necessary to indicate a new resource allocation to the wireless terminal except at the beginning when the second resource is initially allocated. This might be done, for example, at the beginning of a call. The second resource has a smaller transmission capacity than the first resource. In some embodiments, the second resource is completely distinct from the first resource; in other embodiments, the second resource is a subset of the first resource. The pre-allocated resource for silent period may be a very small resource that is sufficient for SID frame transmission.

Figure 5:
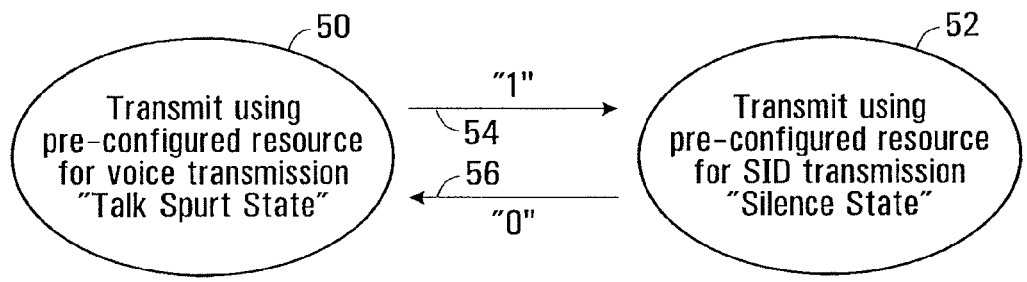
FIG. 5 is a state transition diagram corresponding to the example of FIG. 4.

Both allocated resources are pre-configured during the call setup stage. The resource reservation state transition diagram for this example is illustrated in FIG. 5. The talk-spurt state 50 is characterized by the use of a first pre-configured resource for transmission. The silence state 52 is characterized by the use of a second pre-configured resource for SID frame transmissions. The wireless terminal will DTX for the layer 1 indication when the wireless terminal is not changing (i.e. stays in one state be it silence state or talk-spurt state). When the state changes, the wireless terminal transmits a fast layer 1 indication to the network. The transmission of a "1" signals a transition from talk-spurt state 50 to silence state 52; the transmission of a "0" signals a transition from the silence state 52 to the talk-spurt state 50. Note that in order to improve the reliability, the fast indication may be repeated several times. Since the resource is pre-configured, no additional signalling is required.

Transition from Talk-spurt State to Silence State Period

The wireless terminal can detect the coming silence state period by its buffer status. For example, in some embodiments, if the current voice frame is the last frame during the queue, then a conclusion is reached that a silence state period is coming. The wireless terminal will signal the transition from talk-spurt state to silence state so that the network can release the resource for other purposes. The wireless terminal will transmit the SID frame based on the pre-configured resource allocation in this state.

In some embodiments, the transition from talk-spurt state to silence state is not explicitly signalled. Rather, the network detects the silence state period by itself. This might for example be done by looking for periods with no data transmission or by looking for some indication from the application layer. In such cases, the base station can release the resource without any explicit request from wireless terminal.

Transition from Silence State Period to Talk-spurt State

When new voice packets come, the wireless terminal will signal the transition from silence state to talk-spurt state so that the network will re-allocate the pre-configured resource to the wireless terminal. The wireless terminal will transmit the voice frame based on the pre-configured resource allocation in this state.

Adaptive Layer 1 Indication with MAC Layer Signalling

It can be seen that for most of the time, the wireless terminal will simply DTX for the fast indication since most of the time there will not be a state transition to signal. This could be a waste of uplink resource. In another embodiment, rather than using the layer 1 indication to signal the transition from talk-spurt state to silence state, MAC layer signalling is employed to indicate the silence state period start from the wireless terminal. Assuming the wireless terminal can detect the coming silence state period by its buffer status, for example, the current voice frame is the last frame during the queue, the wireless terminal may use MAC layer signalling to indicate the coming silence state period. In a particular example, in band signalling within the last Voice packet data unit (PDU) transmission, could be performed within an optional field in MAC header. After receiving the signalling, the network can switch the resource reservation mode.

In such embodiments, the fast indication resource is not needed during the talk-spurt state period. This is because the state transition from the talk-spurt state to silence state period is driven by the in-band MAC layer signalling. In some embodiments, the resource that is allocated for the layer 1 signalling is available for re-allocation while the wireless terminal is in the talk-spurt state.

Figure 6:
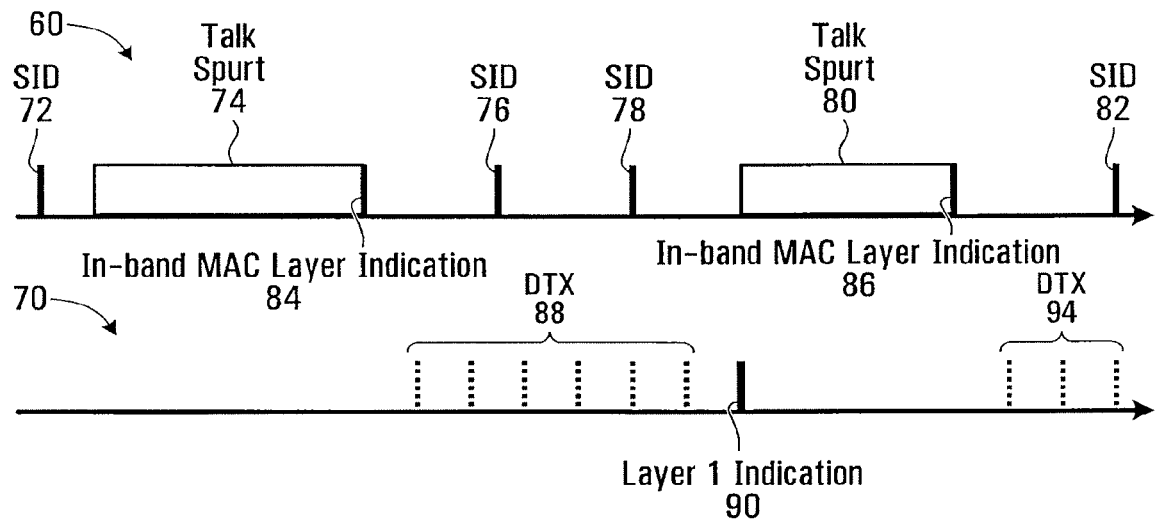
FIG. 6 is a signalling diagram showing VoIP transmissions from a wireless terminal to a base station, and showing layer 1 signalling to indicate state transitions from silence state to talk-spurt state, and showing in-band medium access control (MAC) layer indications for state transitions from talk-spurt state to silence state.

A specific example of signalling implemented in this manner will now be described by way of example with reference to FIG. 6. In FIG. 6, generally indicated at 60 is a sequence of transmissions from a wireless terminal to a base station. The transmissions include a SID frame 72, talk-spurt state 74, SID frames 76,78, talk-spurt state 80 and SID frame 82. During talk bursts 74,80, the wireless terminal is in the talk-spurt state, and between the talk bursts, the mobile terminal is in the silence state. Also shown at the end of talk-spurt state 74 is an in-band MAC layer indication 84 indicating the transition from talk-spurt state to silence state. Similarly, shown at the end of talk-spurt state 80 is an in-band MAC layer indication 86 indicating the transition from talk-spurt state to silence state.

Generally indicated at 70 is an example of fast layer 1 signalling that is used to report the status of the voice activity on the wireless terminal side to the network. In the illustrated example, one information bit is used to indicate the state transition from silence state to talk-spurt state. There is no need to signal the transition from talk-spurt state to silence state since that was taken care of with the in band MAC layer indications. Thus, the layer 1 signalling 70 includes signalling 90 to indicate the transition from silence state to talk-spurt state preceding talk-spurt state 80. The resource for transmitting such a signalling is available for the time that the wireless terminal is in the silence state, but nothing is transmitted when there is no state transition to signal as indicated by DTX period 88,94. For periods that the wireless terminal is in the talk-spurt state, there is no need for an allocation to the mobile terminal for the purpose of signalling state transitions since there will be no transitions from silence state to talk-spurt state during such periods. Thus, the resource is available for allocation for other purposes during such periods.

Figure 7:
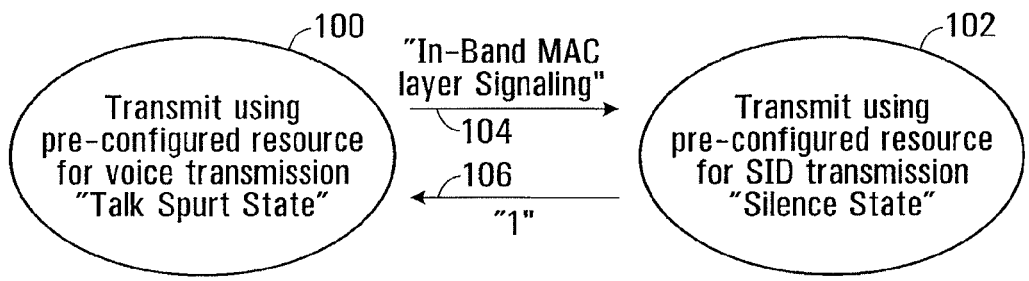
FIG. 7 is a state transition diagram corresponding to the example of FIG. 6.

The resource reservation state transition diagram for this example is illustrated in FIG. 7. The talk-spurt state 100 is characterized by the use of a first pre-configured resource for transmission. The silence state 102 is characterized by the use of a second pre-configured resource for SID frame transmissions. While in the silence state, the wireless terminal will DTX for the layer 1 indication. When the state changes from silence state 102 to talk-spurt state 100, the wireless terminal transmits a fast layer 1 indication 106 to the network. To indicate a transition from talk-spurt state to silence state, the in-band MAC layer indication 104 is employed.

Fast Layer 1 Indication with Uplink NACK/ACK Transmission.

In some embodiments, particularly true for voice communications, the overall communication is symmetric in the sense that there is downlink transmission as well as uplink transmission. The wireless terminal transmits the layer 1 signalling such as NACK/ACK transmission in respect of the downlink transmission. In some embodiments, there is a pre-allocated resource for uplink layer 1 transmission for NACK/ACK transmission that is further employed to transmit two additional state transition signals in addition to the NACK/ACK states to indicate the voice activity status. As a specific example, in some systems, 1 bit NACK/ACK indicator is repeated 10 times for the layer 1 transmission, such as "1" becomes "1111111111" and "0" becomes "0000000000". By using the last two channel bits to represent silence period "XXXXXXXX00" and talk-spurt period "XXXXXXXX11", the state transition can be completed together with NACK/ACK transmission. If talk-spurt to silence is handled by the MAC layer signalling or implicit signalling, then only one state is required.

Figure 8:
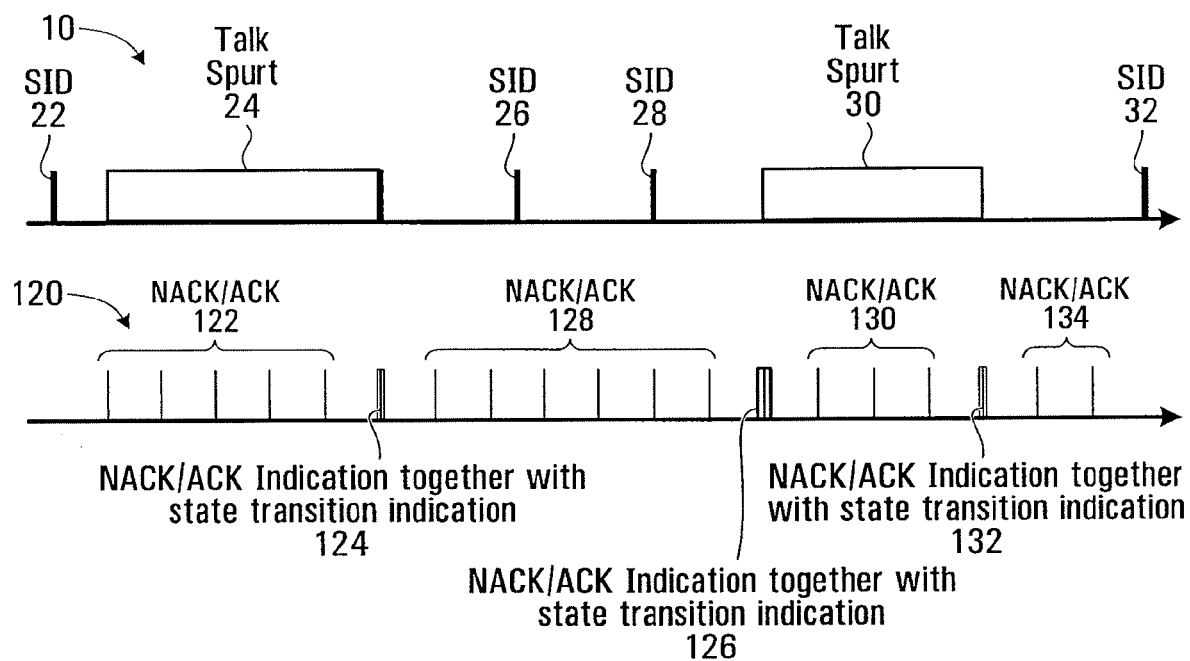
FIG. 8 is a signalling diagram showing VoIP transmissions from a wireless terminal to a base station, and showing layer 1 signalling in the form of NACK/ACK signalling to indicate state transitions.

An example of the operation of such a channel will now be described by way of example with reference to FIG. 8. In FIG. 4, generally indicated at 10 is a sequence of transmissions from a wireless terminal to a base station. This is exactly the same as the example of FIG. 8 and will not be re-described. Generally indicated at 120 is an example of fast layer 1 signalling that is used to report the status of the voice activity on the wireless terminal side to the network. This consists of ACK/NACK signalling 124 to indicate a transition from talk-spurt state to silence state, ACK/NACK signalling 126 to indicate a transition from silence state to talk-spurt state, and ACK/NACK signalling 132. Also shown is ACK/NACK signalling 122,128,130,134 that does not need to include state transition information.

In yet another embodiment, the state transition information is included with CQI (channel quality indication) reporting. For example, additional states in the CQI feedback can be defined that relate to one or the other transition. For example, the current 5 bit CQI can represent 32 states. However, one or multiple states are reserved for future use. By using 2 states to represent the talk-spurt-to-silence transition or silence-to-talk-spurt transition, the state transition can be easily completed together with the CQI transmission. Further, If talk-spurt to silence is handled by the MAC layer signalling or implicit signalling, then only one state is required. Certain coding techniques can be used to optimize the transmission. In this way, additional uplink resource may not be needed.

A pre-curser to the methods described herein is the allocation of an uplink wireless transmission resource to the wireless terminal for use while in the talk-spurt state. Similarly, in some embodiments a second uplink wireless transmission resource is allocated to the wireless terminal for use while in the silence state. The particulars of the transmission resource will of course be implementation specific. They may be OFDM-based or CDMA-based or TDMA-based to name a few examples. The particulars of these initial resource allocations are beyond the scope of this application. The network may be able to re-assign the allocated resources to other purposes while they are not being used by the wireless terminal. This involves the network keeping track of the resources assigned to each wireless terminal, and keeping track of the state of each wireless terminal.

A pre-curser to some of the methods described herein is the allocation of an uplink layer 1 wireless transmission resource to the wireless terminal for use in signalling the state transition information. The particulars of the transmission resource will of course be implementation specific. They may be OFDM-based or CDMA-based to name a few examples. The particulars of these initial resource allocations are beyond the scope of this application. The network may be able to re-assign the allocated resources to other purposes while they are not being used by the wireless terminal. This involves the network keeping track of the resources assigned to each wireless terminal, and keeping track of the state of each wireless terminal.

All of the above embodiments have assumed state feedback in respect of silence to talk-burst (more generally from inactive to active). In another embodiment, feedback in the form of a state transition indication in respect of talk-burst to silence is transmitted from the receiver to the transmitter, (more generally from active to inactive), optionally without any feedback in respect of silence to talk-burst. This may come in the form of MAC layer feedback, for example as described above, layer 1 feedback, for example as described above, ACK/NACK feedback being a specific example of layer 1 feedback, or application layer feedback. Again, associated with such a transition, in some embodiments, is a transition from using a first allocated resource that is semi-persistently allocated for use while in the active state, to using a second allocated resource that is semi-persistently allocated for use while in the inactive state.

Numerous modifications and variations of the present application are possible in light of the above teachings. It is therefore to be understood that within the scope of the appended claims, the embodiments of the application may be practiced otherwise than as specifically described herein.

We claim:

1. A method in a UE in a Long Term Evolution (LTE) system, comprising:
   sending a Voice over IP (VOIP) packet using a Physical Uplink Shared Channel (PUSCH) resource
   sending a scheduling request using a Physical Uplink Control Channel (PUCCH) resource,
   wherein the PUCCH resource is specific to the UE and configured by a Radio Resource Control;
   resending the Scheduling Request at least one time, using PUCCH resource;
   wherein transmissions occur on the PUCCH resource only when the UE is sending a Scheduling Request on the PUCCH resource.

2. The method of claim 1, wherein the Scheduling Request is an indication that the UE has transitioned from an inactive state to an active state.

3. The method of claim 2, wherein the active state is a talk-spurt state for a voice over Internet Protocol 'VoIP' session, and the inactive state is a silence state for the VoIP session.

4. The method of claim 1, wherein the Scheduling Request is indicated by the presence of a transmission on the PUCCH resource.

5. The method of claim 1, wherein the Scheduling Request includes a request for an uplink resource.

6. The method of claim 5, wherein the requested uplink resource is an Uplink Shared Channel resource.

7. A UE configured to implement the method of claim 1.

8. A UE configured to implement the method of claim 2.

9. A UE configured to implement the method of claim 3.

10. A non-transitory computer readable medium having computer executable instructions stored thereon for execution by a UE which, when executed control the execution of the method of claim 1.

11. A method in a wireless base station, the method comprising:
    receiving a Voice over IP (VOIP) packet using a Physical Uplink Shared Channel (PUSCH) resource
    receiving repeated Scheduling Request transmissions from a UE through a Physical Uplink Control Channel (PUCCH) resource,
    wherein the PUCCH resource is specific to the UE and configured by a Radio Resource Control
    wherein transmissions occur on the PUCCH resource only when the particular UE is sending a Scheduling Request on the PUCCH resource.

12. The method of claim 11 wherein the repeated Scheduling Request transmissions indicate that the particular UE has transitioned from an inactive state to an active state.

13. The method of claim 12, wherein the active state is a talk-spurt state for a voice over Internet Protocol 'VoIP' session, and the inactive state is a silence state for the VoIP session.

14. The method of claim 11, wherein the Scheduling Request transmissions are indicated by the presence of transmissions on the PUCCH resource.

15. The method of claim 11, wherein the Scheduling Request includes a request for an uplink resource.

16. The method of claim 15, wherein the request for an uplink resource is a request for an uplink resource.

17. The method of claim 15, further comprising assigning an Uplink Channel to the UE.

18. A base station configured to implement the method of claim 11.

19. A base station configured to implement the method of claim 12.

20. A base station configured to implement the method of claim 13.

21. A non-transitory computer readable medium having computer executable instructions stored thereon for execution by a base station which, when executed control the execution of the method of claim 11.

* * * * *